(12) United States Patent
Shi (10) Patent No.: US 10,823,961 B2
(45) Date of Patent: Nov. 3, 2020

(54) ON-VEHICLE DISPLAY SYSTEM

(71) Applicant: BOE Technology Group Co., Ltd., Beijing (CN)

(72) Inventor: Bingchuan Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 184 days.

(21) Appl. No.: 16/115,885

(22) Filed: Aug. 29, 2018

(65) Prior Publication Data

US 2019/0302451 A1   Oct. 3, 2019

(30) Foreign Application Priority Data

Mar. 30, 2018   (CN) .......................... 2018 1 0276449

(51) Int. Cl.

| G02B 27/14 | (2006.01) |
|---|---|
| G02B 27/01 | (2006.01) |
| B60K 35/00 | (2006.01) |
| B60K 37/02 | (2006.01) |

(52) U.S. Cl.
CPC .......... *G02B 27/0101* (2013.01); *B60K 35/00* (2013.01); *B60K 37/02* (2013.01); *G02B 27/0149* (2013.01); *B60K 2370/155* (2019.05); *B60K 2370/334* (2019.05); *G02B 2027/0154* (2013.01)

(58) Field of Classification Search
CPC .................................................. G02B 27/0101
USPC ....................................................... 359/631
See application file for complete search history.

(56) References Cited

U.S. PATENT DOCUMENTS

| 5,059,956 A * | 10/1991 | Iino ........................ B60K 35/00 |
|---|---|---|
|  |  | 345/7 |
| 5,327,154 A | 7/1994 | Aoki |
| 2016/0085143 A1 | 3/2016 | Hu et al. |
| 2016/0147061 A1 | 5/2016 | Nambara |
| 2017/0232842 A1* | 8/2017 | Kobayashi ............ B60K 37/02 |
|  |  | 359/633 |

FOREIGN PATENT DOCUMENTS

| CN | 104111532 A | 10/2014 |
|---|---|---|
| CN | 104554004 A | 4/2015 |
| CN | 105359030 A | 2/2016 |
| CN | 105404006 A | 3/2016 |
| CN | 105620287 A | 6/2016 |

(Continued)

OTHER PUBLICATIONS

Chinese Office Action dated Dec. 26, 2019 in related Chinese Application No. 201810276449.9.

(Continued)

*Primary Examiner* — James C. Jones
(74) *Attorney, Agent, or Firm* — Arent Fox LLP; Michael Fainberg (57) ABSTRACT

The disclosure discloses an on-vehicle display system including an instrument panel and a display device, where the instrument panel is provided with a protection housing, which is a curved structure recessed toward the instrument panel; the display device is configured to emit light rays of a displayed image; and the protection housing is configured to transmit light exiting from the instrument panel, and to receive and reflect the light rays exiting from the display device to eyes of a driver.

19 Claims, 4 Drawing Sheets

(56) References Cited

FOREIGN PATENT DOCUMENTS

| CN | 106483664 A | 3/2017 |
|---|---|---|
| CN | 206920709 A | 1/2018 |
| FR | 2488555 A | 2/1982 |
| WO | 03016982 A2 | 2/2003 |

OTHER PUBLICATIONS

Office Action for corresponding Chinese Application 201810276449.9 dated Jun. 5, 2019.

* cited by examiner

ON-VEHICLE DISPLAY SYSTEM

CROSS-REFERENCE TO RELATED APPLICATION

This application claims priority to Chinese Patent Application No. 201810276449.9, filed on Mar. 30, 2018, the content of which is incorporated by reference in the entirety.

TECHNICAL FIELD

The disclosure relates to the field of display technologies, and particularly to an on-vehicle display system.

DESCRIPTION OF THE RELATED ART

An on-vehicle instrument system, which is an important component of a vehicle, is configured to provide a vehicle speed, a rotation speed, the amount of gas, water temperature, an engine failure indication, an on-vehicle device status, and other intra-vehicle information for a driver, and is a basis of vehicle safety. As the vehicle industry is developing, a head-up display system has emerged gradually in the field of aided vehicle driving in recent years, and as compared with a traditional on-vehicle instrument system, the head-up display system is more focused on assisting with external environmental information, e.g., early warning on a road condition, keeping the vehicle in a lane, planning a route, etc. Although both of the systems are configured to provide the driver with different information, they cannot be functionally replaced with each other due to their respective characteristics in use, but can play their respective roles in various application scenarios.

Here the on-vehicle instrument system is adapted to display the whole status information, and as a result, the driver is provided with and tends to think about a lot of information, so the requirement for real-time data is relatively low; while the head-up display system is generally configured to display crucial information, and needs to enable the information to be displayed in real time in the most straightforward manner. And technically, the on-vehicle instrument system needs to provide a large angle of view, so that it can be viewed in various statuses; and the head-up display system is only configured for a driving status, and can only be viewed in a limited range but at a comfortable distance. Further, at present, both of the display systems have been involved in some vehicle designs, but a significant space in the vehicle may be occupied by the two systems, thus discouraging the experience of the user in the vehicle.

SUMMARY

Embodiments of the disclosure provide an on-vehicle display system.

In an aspect, the embodiments of the disclosure provide an on-vehicle display system including an instrument panel and a display device, wherein: the instrument panel is provided with a protection housing, which is a curved structure recessed toward the instrument panel; the display device is configured to emit light rays of a displayed image; and the protection housing is configured to transmit light exiting from the instrument panel, and to receive and reflect the light rays exiting from the display device to eyes of a driver.

In some embodiments, in the on-vehicle display system above according to the embodiments of the disclosure, the on-vehicle display system further includes an optical path redirecting component configured to receive and reflect the light rays exiting from the display device to the protection housing.

In some embodiments, in the on-vehicle display system above according to the embodiments of the disclosure, the optical path redirecting component is a planar reflecting mirror.

In some embodiments, in the on-vehicle display system above according to the embodiments of the disclosure, the optical path redirecting component is a convex reflecting mirror.

In some embodiments, in the on-vehicle display system above according to the embodiments of the disclosure, a length of an optical path from the display device to the protection housing is shorter than a focus length of an optical system consists of the optical path redirecting component and the protection housing.

In some embodiments, in the on-vehicle display system above according to the embodiments of the disclosure, a length of an optical path from the optical path redirecting component to the protection housing is shorter than a focus length of the protection housing.

In some embodiments, in the on-vehicle display system above according to the embodiments of the disclosure, the protection housing is made of a transparent material.

In some embodiments, in the on-vehicle display system above according to the embodiments of the disclosure, the on-vehicle display system further includes a lens assembly located on an optical path between the display device and the protection housing; and the lens assembly is configured to optimize imaging of the display device.

In some embodiments, in the on-vehicle display system above according to the embodiments of the disclosure, the lens assembly has a dually-glued structure.

In some embodiments, in the on-vehicle display system above according to the embodiments of the disclosure, the protection housing is a protection housing of an instrument panel located right ahead of a driving seat.

In some embodiments, in the on-vehicle display system above according to the embodiments of the disclosure, the display device is a liquid crystal display device, a liquid crystal on silicon display device, a digital light processing projection display device, or a laser scanning display device.

In some embodiments, in the on-vehicle display system above according to the embodiments of the disclosure, the display device is an organic light-emitting diode display device.

In some embodiments, in the on-vehicle display system above according to the embodiments of the disclosure, the display device includes an illumination module, which is a narrow-band primary-color backlight module.

In some embodiments, in the on-vehicle display system above according to the embodiments of the disclosure, a high reflecting film is arranged on a surface of the protection housing on a side thereof facing away from the instrument panel; and the high reflecting film is configured to enhance a reflectivity of light exiting from the illumination module.

In some embodiments, in the on-vehicle display system above according to the embodiments of the disclosure, the illumination module includes a light source and a light equalizing device located on a optical path of the light source.

In some embodiments, in the on-vehicle display system above according to the embodiments of the disclosure, the light equalizing device is a light reflecting cup.

In some embodiments, in the on-vehicle display system above according to the embodiments of the disclosure, the light equalizing device is an integrator.

In some embodiments, in the on-vehicle display system above according to the embodiments of the disclosure, an adjusting knob is arranged on a side of the protection housing, and the adjusting knob is configured to be rotated to bring the protection housing into rotation to thereby adjust an angle between the protection housing and a driving plane of a vehicle.

In some embodiments, in the on-vehicle display system above according to the embodiments of the disclosure, the displayed image of the display device is reflected by the protection housing into an image with a field of view below a field of view for driving of the vehicle.

In some embodiments, in the on-vehicle display system above according to the embodiments of the disclosure, the displayed image of the display device is reflected by the protection housing into an image at a distance of 5 m to 10 m from the eyes of the driver.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Embodiments of the disclosure provide an on-vehicle display system so as to improve the safety of a driving user, and the experience thereof in a vehicle without occupying a significant space in the vehicle.

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

The sizes and shapes of respective components in the drawings are not intended to reflect any real proportion of the display device, but only intended to illustrate the content of the disclosure.

Figure 1:
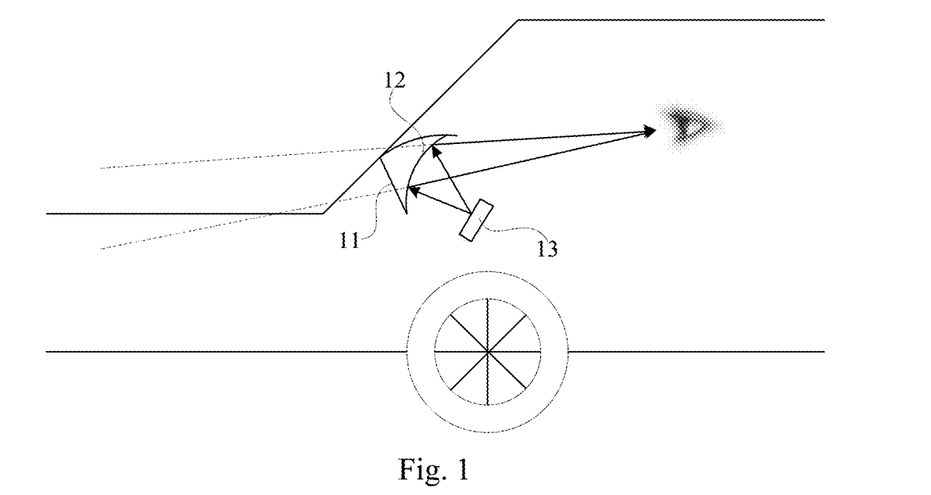
FIG. 1 is a first schematic structural diagram of an on-vehicle display system according to the embodiments of the disclosure.

As illustrated in FIG. 1, an on-vehicle display system according to the embodiments of the disclosure includes an instrument panel 11 with a protection housing 12 located at an exterior of the instrument panel, and a display device 13.

Here the protection housing 12 is a curved structure recessed toward the instrument panel 11; the display device 13 is configured to emit light rays of a displayed image; and the protection housing 12 is configured to transmit light exiting from the instrument panel 11, and to receive and reflect the light rays exiting from the display device 13 to eyes of a driver.

The on-vehicle display system above according to the embodiments of the disclosure integrates an on-vehicle instrument and a head-up display, where the protection housing of the instrument panel acts as a reflecting mirror of the display device, and both of the instrument panel and the display device constitute a head-up display system, so that the on-vehicle display system is made compact in structure without occupying a significant space in the vehicle. In the meanwhile, the protection housing of the instrument panel acts as the reflecting mirror for the human eyes to view an image on the display device to thereby shorten the distance between the human eyes and the reflecting mirror, so that the human eyes view the image on the display device at a viewing distance comfortable to the human eyes, and the driving user views either a driving road or the image on the display device without adjusting the focus length of the human eyes, thus avoiding the driving user from being visually interrupted, so as to improve the safety of driving, and the experience in the vehicle.

Figure 2:
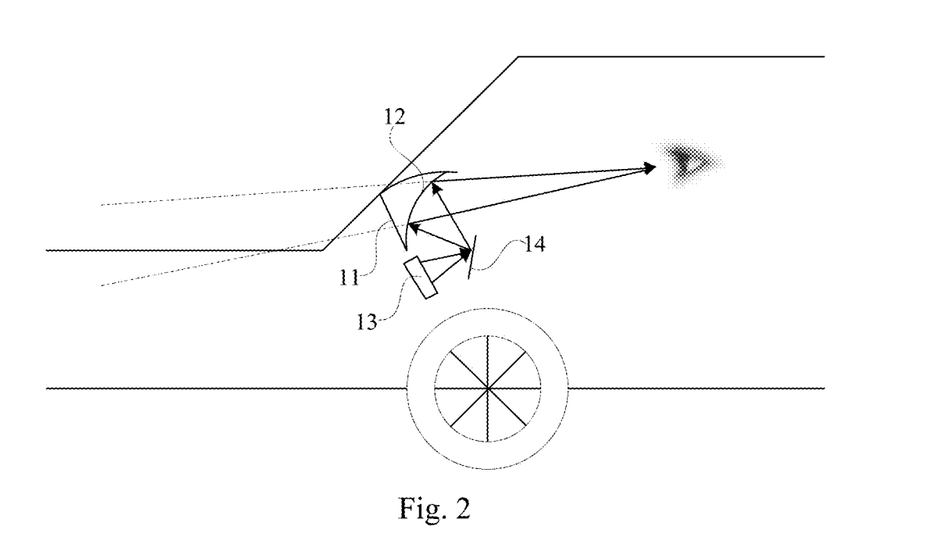
FIG. 2 is a second schematic structural diagram of an on-vehicle display system according to the embodiments of the disclosure.

In some embodiments, in the on-vehicle display system above according to the embodiments of the disclosure, as illustrated in FIG. 2, the on-vehicle display system further includes an optical path redirecting component 14 configured to receive and reflect the light rays exiting from the display device 13 to the protection housing 12.

As illustrated in FIG. 2, when the optical path redirecting component is arranged in the on-vehicle display system above according to the embodiments of the disclosure, the image displayed on the display device is transmitted to the optical path redirecting component 14, further reflected by the optical path redirecting component 14 to the protection housing 12, and finally reflected by the protection housing 12 into the human eyes, which receive the image. The optical path redirecting component 14 can turn over an optical path of the display device 13 to thereby further narrow a space occupied in the vehicle; and also the optical path redirecting component can lengthen an optical path length so that there is a longer image distance of the imaging system.

In some embodiments, the optical path redirecting component 14 is arranged as a planar reflecting mirror as illustrated in FIG. 2. In some embodiments, it can alternatively be arranged as a prism, a combination of a reflecting mirror and a prism, etc., although the embodiments of the disclosure will not be limited thereto. The optical system is composed of the planar reflecting mirror, and the light-reflecting surface of the protection housing 12, so that the position where the light rays are incident on the light-reflecting surface of the protection housing 12 can be determined by adjusting an inclination angle of the planar reflecting mirror, the distance between the planar reflecting mirror and the protection housing, the distance between the planar reflecting mirror and the display device, and other parameters, to thereby adjust the imaging position and size of the optical system.

Figure 3:
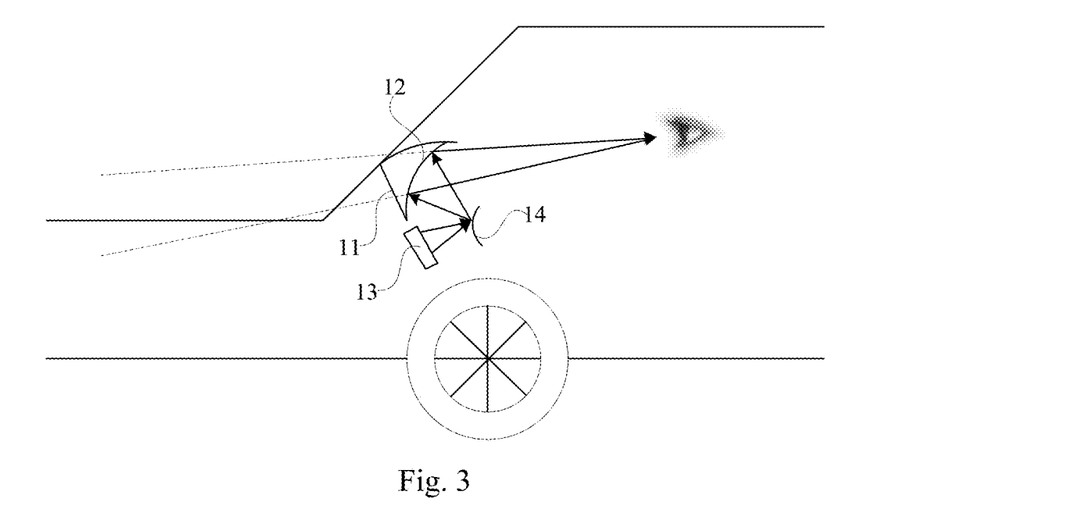
FIG. 3 is a third schematic structural diagram of an on-vehicle display system according to the embodiments of the disclosure.

In some embodiments, the optical path redirecting component 14 is arranged as a convex reflecting mirror as illustrated in FIG. 3. The optical system is composed of the convex reflecting mirror and the protection housing to produce a magnified virtual image, so that the image displayed on the display device 13 can be magnified and displayed at a longer distance. In some embodiments, the optical path redirecting component 14 can alternatively be arranged as a concave reflecting mirror; and the optical system composed of the concave reflecting mirror and the protection housing can also magnify the image displayed on the display device 13, and have it displayed at a longer distance. The optical path redirecting component is embodied as a reflecting mirror instead of a lens to thereby avoid dispersion during imaging through the lens. Where the convex reflecting mirror and the protection housing are configured with an off-axis optical path to thereby avoid the convex reflecting mirror from blocking an imaging beam.

In a practical application, a length of an optical path from the display device 13 to the protection housing 12 is shorter than a focus length of the optical system composed of the convex reflecting mirror and the protection housing, so that the optical system can generate a magnified virtual image. And in some embodiments, a length of an optical path from the convex reflecting mirror to the protection housing is set to be shorter than a focus length of the protection housing. Where the protection housing 12 is made of a transparent material with a uniform thickness and a concave surface thereof is structured as a spherical surface, an aspheric surface, a free-form surface, etc., to thereby magnify the image of the display device 13. Further, in some embodiments, the convex reflecting mirror is structured with an off-axis aspheric surface, a free-form surface, a cylindrical surface, or another non-axis-symmetric surface to thereby correct the astigmatism arising from the off-axis operating light-reflecting surface of the protection housing.

Figure 4:
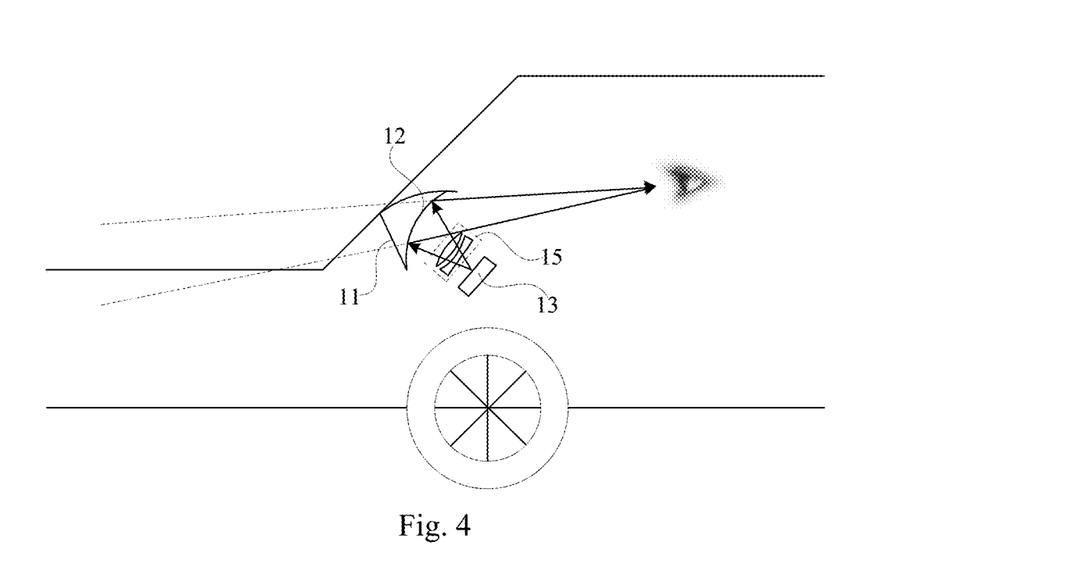
FIG. 4 is a fourth schematic structural diagram of an on-vehicle display system according to the embodiments of the disclosure.

In some embodiments, in the on-vehicle display system above according to the embodiments of the disclosure, as illustrated in FIG. 4, the on-vehicle display system further includes a lens assembly 15 located on an optical path between the display device 13 and the protection housing 12, where the lens assembly is configured to optimize the imaging of the display device. In some embodiments, the lens assembly is of a dually-glued structure to thereby eliminate chromatic aberration. Alternatively the lens assembly can be embodied as another combination of lenses to shape, focus, diverge, or otherwise the optical path of imaging, although the embodiments of the disclosure will not be limited thereto.

Understandably, there are more than one instrument panel in the vehicle, thus in order to fit with the position of the driver, a protection housing of an instrument panel located right ahead of a driving seat is set as the above curved structure. Hence, the protection housing can be used as the reflecting mirror of the display device, so that the image of the display device is located right ahead of the driving seat, which is more convenient for the driver to view.

In a practical application, the display device 13 is a display device with backlight, or is a self-luminous display device. In some embodiments, when the display device is provided with backlight, it can be a Liquid Crystal Display (LCD), a Liquid Crystal on Silicon (LCOS) display device, a projection device with a Digital Light Processing (DLP) architecture including a Digital Micro-mirror Device (DMD) as a core component, or a laser scanning display device. When the display device is a self-luminous display device, it can be an organic Light-Emitting Diode (OLED) display device, etc. It shall be noted that, the display device has been exemplified above in the embodiments of the disclosure, but the display device can alternatively be embodied otherwise as needed, and will not be limited to the types of display device exemplified above.

Figure 5:
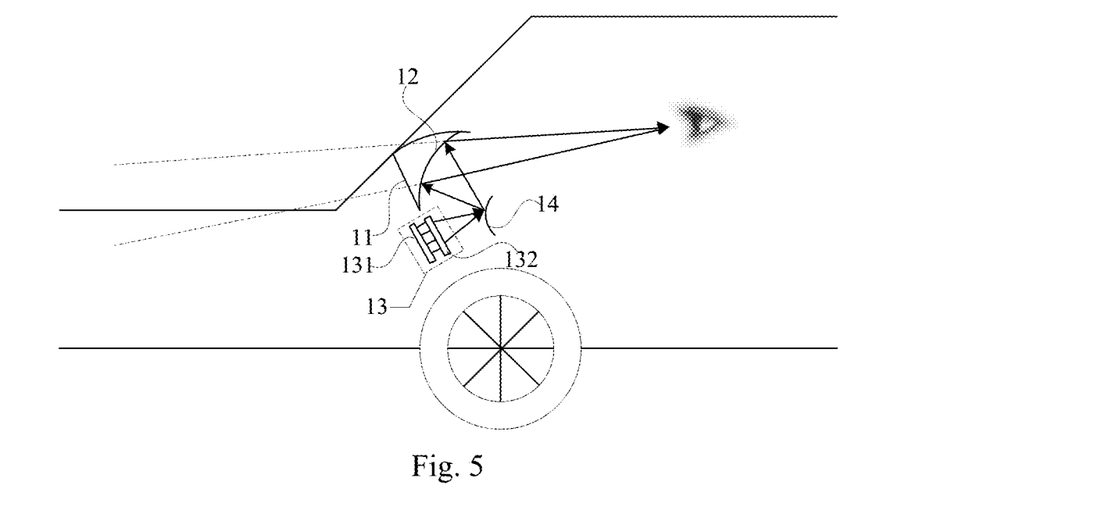
FIG. 5 is a fifth schematic structural diagram of an on-vehicle display system according to the embodiments of the disclosure.

In some embodiments, as illustrated in FIG. 5, when the display device 13 is a display device with backlight, the display device 13 includes an illumination module 131. Where the illumination module is embodied as a narrow-band primary-color backlight module, and configured to exit narrow-band light in three primary colors to thereby improve the purity of the emitted light in the three primary colors so as to improve the gamut of the light exiting from the illumination module. In some embodiments, as illustrated in FIG. 5, the display device 13 further includes a two-dimension optical array 132 located at a light-emitting side of the illumination module 131. Where the two-dimension optical array can be a liquid crystal display panel, a liquid crystal on silicon display panel, etc., where there are different drive circuits and different drive principles of different types of display panels, and their drive circuits and drive principles are similar to those of the display panels in the related art, so a repeated description thereof will be omitted here.

In some embodiments, a high reflecting film is arranged on a surface of the protection housing 12 on a side thereof facing away from the instrument panel 11, where the high reflecting film has an effect of enhancing the reflectivity of the narrow-band light among the light exiting from the illumination module. With this arrangement, the reflectivity of the narrow-band light emitted by the illumination module 131 can be enhanced as much as possible while a light wave beyond a reflection band is guaranteed to be transmitted. In some embodiments, when the high reflecting film above is made of a material with a reflectivity adapted to the narrowband wavelength of the three primary colors, the reflectivity of the three primary colors can be improved by a factor of 80%, and also the transmittance of other light waves beyond the reflection band can be maintained above 80%.

Figure 6:
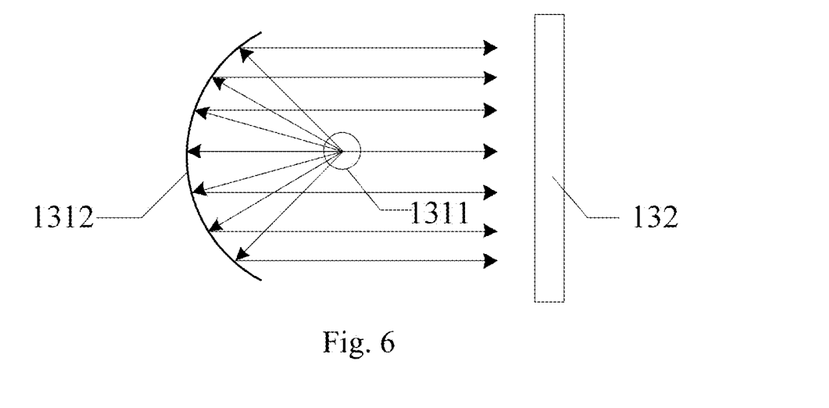
FIG. 6 is a first schematic structural diagram of an illumination module according to the embodiments of the disclosure.
Figure 7:
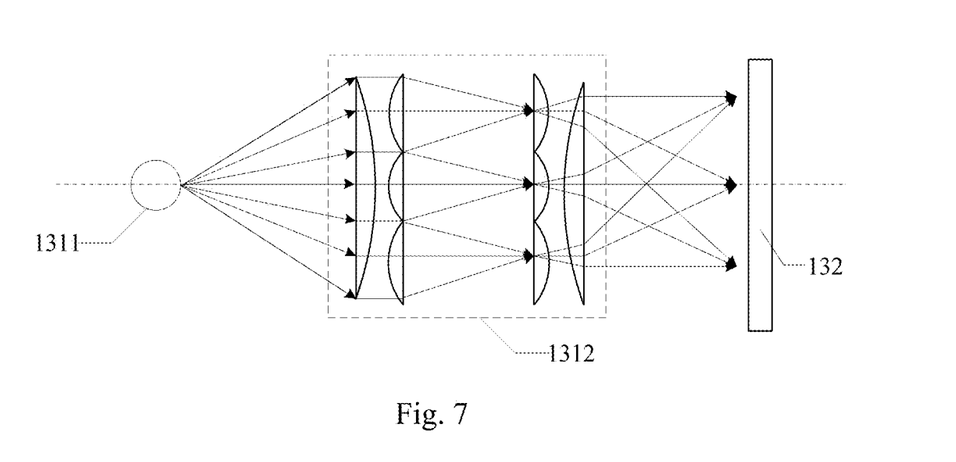
FIG. 7 is a second schematic structural diagram of an illumination module according to the embodiments of the disclosure.

In some embodiments, in the on-vehicle display system above according to the embodiments of the disclosure, as illustrated in FIG. 6 and FIG. 7, the illumination module 131 includes a light source 1311, and a light equalizing device 1312 located on an optical path of the light source. Since there is a limited volume of the display device 13, a point light source can be configured for illumination.

By way of an example, the light source 1311 can be a semiconductor laser, a laser diode, a light-emitting diode, etc., and these three types of light sources have a small volume, and are well developed, so they are appropriate for the light source of the display device.

In a practical application, the light equalizing device 1312 is a light reflecting cup or an integrator. When the light equalizing device 1312 is a light reflecting cup, a structure and a light exit optical path thereof are as illustrated in FIG. 6, and the light source 1311 (which can be a point light source) is arranged at a position of a focus of the reflecting cup, so that light exiting from the light source 1311 exits in parallel after being reflected by the reflecting cup, for the effect of being equalized. Further, the light equalizing device 1312 can alternatively be embodied as an integrator, and a structure and a light exit optical path thereof are as illustrated in FIG. 7, where the integrator includes two lens arrays, each of which is configured with a collimating lens, and the light source 1311 is arranged at a position of a focus of a first collimating lens closer thereto, so that parallel light generated by the first collimating lens is transmitted to a first lens array configured with the first collimating lens; and a second lens array is located at a position of a focal plane of the first lens array, so the parallel light is segmented by the first lens array, then converged on the second lens array, and finally collimated by a second collimating lens of the second lens array, so that the light exiting from the light source can be equalized.

Figure 8:
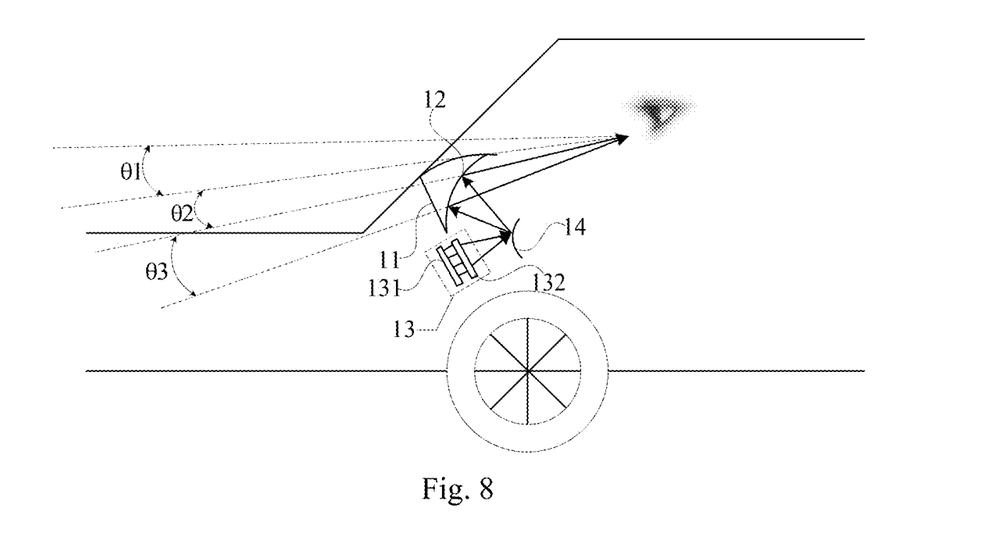
FIG. 8 is a schematic diagram of an angle of view of an on-vehicle display system according to the embodiments of the disclosure.

In some embodiments, in the on-vehicle display system above according to the embodiments of the disclosure, an adjusting knob is arranged on a side of the protection housing 12, where the adjusting knob is configured to be rotated to bring the protection housing into rotation to thereby adjust an angle between the protection housing and a driving plane of the vehicle. As illustrated in FIG. 8, a position of an angle of view for imaging of the display device 13 is controlled by a set angle of the protection housing 12, so a resulting angle of view for imaging of the display device 13 can be varied by finely tuning an inclination angle of the protection housing 12. In a practical application, the angle of view for imaging of the display device 13 can be made approximating but not overlapping with an angle of view at which the user views the driving condition, so that the line of sight of the user can be switched between the driving condition, and the image of the display device.

In a practical application, as illustrated in FIG. 8, in the optical system consists of the display device and the protection housing, the displayed image of the display device is reflected by the protection housing into an image with a field of view (corresponding to an angle $\theta 3$ of view) below a field of view for driving (corresponding to an angle $\theta 1$ of view) of the vehicle. Since there is a transition area (corresponding to an angle $\theta 2$ of view) between the two fields of view due to the limiting contour of the vehicle, the angle $\theta 3$ of view for imaging of the display device can be improved as a whole by tuning the adjusting knob above located on the side of the protection housing, to thereby narrow the angle $\theta 2$ of view in the transition area, and at this time, a virtual image of the display device is generated at a short distance below an object outside the vehicle, so that it can be viewed conveniently by the user.

Since a viewing distance comfortable to the human eyes ranges from 5 m to 10 m, thus in the embodiments of the disclosure, a distance between a resulting image after the displayed image of the display device 13 is reflected by the protection housing, and the eyes of the driver can be adjusted to 5 m to 10 m by setting the curvature, the focus length, and other parameters of the protection housing 12, to thereby be adapted to the viewing distance comfortable to the human eyes, so that the light of sight of the user can be switched between the assisting image of the display device, and the driving condition without adjusting the focus length of the human eyes, so as to improve the safety and experience of driving the vehicle.

An on-vehicle display system according to the embodiments of the disclosure includes an instrument panel and a display device, where the instrument panel is provided with a protection housing, which is a curved structure recessed toward the instrument panel; the display device is configured to emit light rays of a displayed image; and the protection housing is configured to transmit light exiting from the instrument panel, and to receive and reflect the light rays exiting from the display device to eyes of a driver. The on-vehicle display system above integrates an on-vehicle instrument and a head-up display together, where the protection housing of the instrument panel acts as a reflecting mirror of the display device, so that the on-vehicle display system is made compact in structure without occupying a significant space in the vehicle. In the meanwhile, the protection housing of the instrument panel acts as the reflecting mirror for human eyes to view the image on the display device to thereby shorten the distance between the human eyes and the reflecting mirror, so that the human eyes view the image on the display device at a viewing distance comfortable to the human eyes, and a line of sight of the user can be switched between a driving road, and the image on the display device without adjusting the focus length of the human eyes, thus avoiding the driving user from being visually interrupted, so as to improve the safety of driving, and the experience in the vehicle.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An on-vehicle display system, comprising an instrument panel and a display device, wherein:
   the instrument panel is provided with a protection housing, which is a curved structure recessed toward the instrument panel;
   the display device is configured to emit light rays of a displayed image; and
   the protection housing is configured to transmit light exiting from the instrument panel, and to receive and reflect the light rays exiting from the display device to eyes of a driver;
   wherein an adjusting knob is arranged on a side of the protection housing, and the adjusting knob is configured to be rotated to bring the protection housing into rotation to thereby adjust an angle between the protection housing and a driving plane of a vehicle.

2. The on-vehicle display system according to claim 1, wherein the on-vehicle display system further comprises an optical path redirecting component configured to receive and reflect the light rays exiting from the display device to the protection housing.

3. The on-vehicle display system according to claim 2, wherein the optical path redirecting component is a planar reflecting mirror.

4. The on-vehicle display system according to claim 2, wherein the optical path redirecting component is a convex reflecting mirror.

5. The on-vehicle display system according to claim 4, wherein a length of an optical path from the display device to the protection housing is shorter than a focus length of an optical system consists of the optical path redirecting component and the protection housing.

6. The on-vehicle display system according to claim 4, wherein a length of an optical path from the optical path redirecting component to the protection housing is shorter than a focus length of the protection housing.

7. The on-vehicle display system according to claim 1, wherein the protection housing is made of a transparent material.

8. The on-vehicle display system according to claim 1, wherein the on-vehicle display system further comprises a lens assembly located on an optical path between the display device and the protection housing; and the lens assembly is configured to optimize imaging of the display device.

9. The on-vehicle display system according to claim 8, wherein the lens assembly has a dually-glued structure.

10. The on-vehicle display system according to claim 1, wherein the protection housing is a protection housing of an instrument panel located right ahead of a driving seat.

11. The on-vehicle display system according to claim 1, wherein the display device is a liquid crystal display device, a liquid crystal on silicon display device, a digital light processing projection display device, or a laser scanning display device.

12. The on-vehicle display system according to claim 1, wherein the display device is an organic light-emitting diode display device.

13. The on-vehicle display system according to claim 11, wherein the display device comprises an illumination module, which is a narrow-band primary-color backlight module.

14. The on-vehicle display system according to claim 13, wherein a high reflecting film is arranged on a surface of the protection housing on a side thereof facing away from the instrument panel; and the high reflecting film is configured to enhance a reflectivity of light exiting from the illumination module.

15. The on-vehicle display system according to claim 13, wherein the illumination module comprises a light source and a light equalizing device located on an optical path of the light source.

16. The on-vehicle display system according to claim 15, wherein the light equalizing device is a light reflecting cup.

17. The on-vehicle display system according to claim 15, wherein the light equalizing device is an integrator.

18. The on-vehicle display system according to claim 1, wherein the displayed image of the display device is reflected by the protection housing into an image with a field of view below a field of view for driving of the vehicle.

19. The on-vehicle display system according to claim 18, wherein the displayed image of the display device is reflected by the protection housing into an image at a distance of 5 m to 10 m from the eyes of the driver.

\* \* \* \* \*